United States Patent
Feeley et al.

(10) Patent No.: US 9,588,697 B2
(45) Date of Patent: *Mar. 7, 2017

(54) HOST CONTROLLER

(71) Applicant: Micron Technology, Inc., Boise, ID (US)

(72) Inventors: Peter Feeley, Boise, ID (US); Robert N. Leibowitz, Boise, ID (US); William H. Radke, Los Gatos, CA (US); Neal A. Galbo, Boca Raton, FL (US); Victor Y. Tsai, Palo Alto, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/718,461

(22) Filed: May 21, 2015

(65) Prior Publication Data

US 2016/0004436 A1 Jan. 7, 2016

Related U.S. Application Data

(63) Continuation of application No. 14/055,436, filed on Oct. 16, 2013, now Pat. No. 9,043,506, which is a
(Continued)

(51) Int. Cl.
*G06F 13/28* (2006.01)
*G06F 3/00* (2006.01)
(Continued)

(52) U.S. Cl.
CPC ............ *G06F 3/061* (2013.01); *G06F 3/0659* (2013.01); *G06F 3/0685* (2013.01); *G06F 13/28* (2013.01);
(Continued)

(58) Field of Classification Search
None
See application file for complete search history.

(56) References Cited

U.S. PATENT DOCUMENTS 5,459,867 A 10/1995 Adams et al.
5,548,742 A * 8/1996 Wang ................. G06F 12/0864
711/128
(Continued)

FOREIGN PATENT DOCUMENTS

TW 200900931 A 1/2009
TW 200903500 A 1/2009

OTHER PUBLICATIONS

International Search Report and Written Opinion for related PCT Application Serial No. PCT/US2010/000150, mailed Aug. 25, 2010 (9 pgs.).
(Continued)

*Primary Examiner* — Michael Sun
(74) *Attorney, Agent, or Firm* — Brooks, Cameron & Huebsch, PLLC

(57) ABSTRACT

The present disclosure includes methods, devices, and systems for controlling a memory device. One method for controlling a memory device embodiment includes storing device class dependent information and a command in one or more of host system memory and host controller memory, setting a pointer to the command in a register in a host controller, directing access to the one or more of host system memory and host controller memory with the memory device via the host controller; and executing the command with the memory device.

18 Claims, 6 Drawing Sheets

Related U.S. Application Data continuation of application No. 13/618,464, filed on Sep. 14, 2012, now Pat. No. 8,578,070, which is a continuation of application No. 12/359,537, filed on Jan. 26, 2009, now Pat. No. 8,327,040.

(51) Int. Cl.
*G06F 3/06* (2006.01)
*G06F 13/38* (2006.01)
*G06F 13/32* (2006.01)
*G06F 13/42* (2006.01)

(52) U.S. Cl.
CPC ............ *G06F 13/32* (2013.01); *G06F 13/385* (2013.01); *G06F 13/4282* (2013.01)

(56) References Cited

U.S. PATENT DOCUMENTS

| | | | |
|---|---|---|---|
| 6,009,478 A | 12/1999 | Panner et al. | |
| 6,134,631 A * | 10/2000 | Jennings, III | H04N 19/61 348/266 |
| 6,851,014 B2 | 2/2005 | Chang et al. | |
| 6,964,023 B2 | 11/2005 | Maes et al. | |
| 7,191,256 B2 | 3/2007 | Adams et al. | |
| 7,191,268 B2 | 3/2007 | Adams et al. | |
| 7,225,326 B2 | 5/2007 | Bennett | |
| 7,296,094 B2 | 11/2007 | Bashford et al. | |
| 7,587,542 B2 | 9/2009 | Riley et al. | |
| 7,908,335 B1 | 3/2011 | Citterelle et al. | |
| 8,244,984 B1 | 8/2012 | Glasco et al. | |
| 2001/0014933 A1 | 8/2001 | Shibazaki et al. | |
| 2001/0044861 A1 | 11/2001 | Niwa et al. | |
| 2002/0093507 A1 | 7/2002 | Olarig | |
| 2003/0233487 A1* | 12/2003 | Ruget | G06F 9/4411 719/321 |
| 2004/0054689 A1 | 3/2004 | Salmonsen et al. | |
| 2004/0213289 A1* | 10/2004 | Liu | H04L 12/12 370/469 |
| 2005/0235072 A1 | 10/2005 | Smith et al. | |
| 2006/0075164 A1 | 4/2006 | Ooi | |
| 2006/0101475 A1* | 5/2006 | Mallet | G06F 9/547 719/318 |
| 2007/0011180 A1 | 1/2007 | Peretz et al. | |
| 2007/0033326 A1 | 2/2007 | Sinclair | |
| 2007/0204074 A1 | 8/2007 | Ishida et al. | |
| 2008/0195802 A1* | 8/2008 | Lee | G06F 12/0246 711/103 |
| 2009/0024937 A1* | 1/2009 | Lauff | G06F 8/20 715/762 |
| 2009/0172308 A1 | 7/2009 | Prins et al. | |
| 2009/0172384 A1* | 7/2009 | Anson | G06F 9/44505 713/2 |
| 2009/0300238 A1 | 12/2009 | Panabaker et al. | |

OTHER PUBLICATIONS

Office Action from related Taiwanese Application No. 099101250, dated Aug. 29, 2013, 37 pages.

* cited by examiner

HOST CONTROLLER

PRIORITY INFORMATION

This application is a Continuation of U.S. application Ser. No. 14/055,436 filed Oct. 16, 2013, which is a Continuation of U.S. application Ser. No. 13/618,464 filed Sep. 14, 2012, now U.S. Pat. No. 8,578,070, which is a Continuation of U.S. application Ser. No. 12/359,537 filed Jan. 26, 2009, now U.S. Pat. No. 8,327,040, all of which are incorporated herein by reference.

TECHNICAL FIELD

The present disclosure relates generally to semiconductor memory devices, methods, and systems, and more particularly, to host controllers.

BACKGROUND

Memory devices are typically provided as internal, semiconductor, integrated circuits and/or external removable devices in computers, personal digital assistants (PDAs), digital cameras, and cellular telephones, among various other electronic devices. There are many different types of memory including random-access memory (RAM), read only memory (ROM), dynamic random access memory (DRAM), synchronous dynamic random access memory (SDRAM), phase change random access memory (PCRAM), and flash memory, among others.

Flash memory devices are utilized as non-volatile memory for a wide range of electronic applications. Flash memory devices typically use a one-transistor memory cell that allows for high memory densities, high reliability, and low power consumption.

Various types of memory can be used in memory systems. The various types of memory can be used in any combination to provide memory for a host device. For example, Flash memory can be included in a memory system. Flash memory can be part of a memory system as internal memory or as removable memory that can be coupled to the memory system through an interface, such as a USB connection.

A memory system can include a host device, host system memory, and a number of external memory devices. The host device can have a number of processors, a host controller, host controller memory that is located on the host controller, and a number of internal memory devices. The host device can use the internal and/or the external memory devices by interacting with the memory devices via a host controller. The host controller can communicate with the memory devices to perform operations on the memory devices, such as reading data from the memory devices to the host system or writing data from the host system to the memory devices. The commands that control the reading and writing of data can be built by the host system. The host controller can have hardware that controls the memory device capabilities in the commands. In such cases when a host controller has hardware that defines the memory devices capabilities, the host controller is limited to building commands that have the capabilities associated with the hardware that is on the host controller.

DETAILED DESCRIPTION

Figure 1:
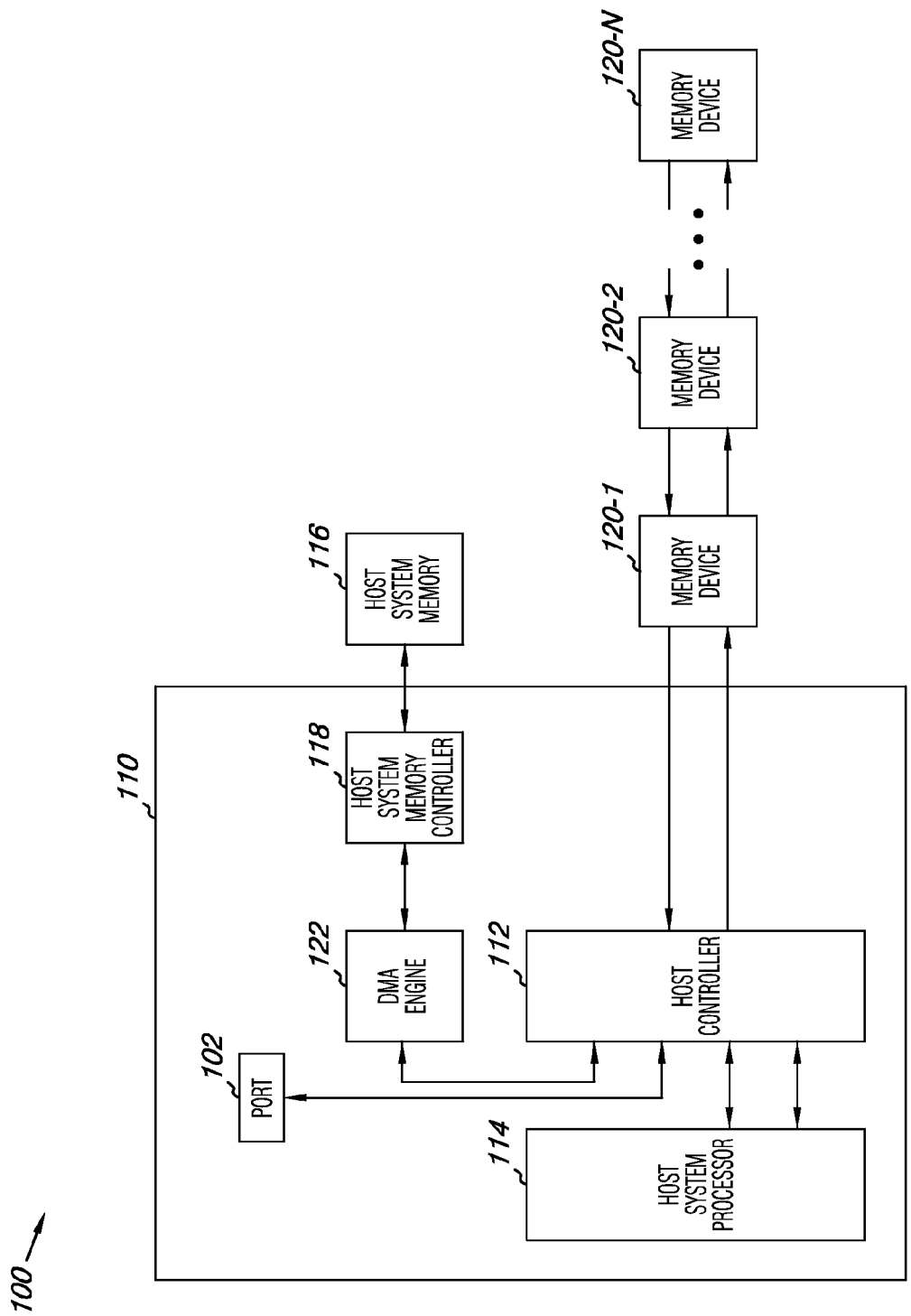
FIG. 1 illustrates a block diagram of a memory system in accordance with one or more embodiments of the present disclosure.

The present disclosure includes methods, devices, and systems for controlling a memory device. One method for controlling a memory device embodiment includes storing device class dependent information and a command in one or more of host system memory and host controller memory, setting a pointer to the command in a register in a host controller, directing access to the one or more of host system memory and host controller memory with the memory device via the host controller; and executing the command with the memory device.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N," particularly with respect to reference numerals in the drawings, indicates that a number of the particular feature so designated can be included with one or more embodiments of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the use of similar digits. For example, 112 may reference element "12" in FIG. 1, and a similar element may be referenced as 212 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

FIG. 1 illustrates a block diagram of a memory system 100 in accordance with one or more embodiments of the present disclosure. In FIG. 1, a host system 110 is shown. In one or more embodiments, the host system can be a computing device, such as a personal computer, among other computing device types. Examples of a host system 110 include laptop computers, personal computers, mobile phone, digital cameras, digital recording and play back devices, PDA's, memory card readers, and interface hubs, among other examples. The host system 110 of FIG. 1 includes a host controller 112, a host system processor 114, a port 102, and a direct memory access (DMA) engine 122, among other computing device elements not shown. As illustrated in FIG. 1, the host controller 112 can include a transaction layer, link layer, and/or physical layer and can be coupled to host system memory 116 via the DMA engine 122 and the host system memory controller 118. Also, in FIG. 1, host controller 112 is coupled to memory devices 120-1, 120-2, . . . , 120-N.

In one or more embodiments, the host controller 112 can be used to communicate information between the number of memory devices 120-1, 120-2, . . . , 120-N and another device, such as the host system 110. One of ordinary skill in the art will appreciate that "a processor" can intend one or more processors, such as a parallel processing system, a number of coprocessors, etc. In some embodiments, the host controller 112 can manage transport, link, and physical layer activity without processor intervention and manage command retries without processor intervention.

In one or more embodiments, the host controller 112 can be coupled to a standardized interface. For example, when the memory devices 120-1, 120-2, . . . , 120-N is used for data storage for a memory system, the host controller can implement a serial advanced technology attachment (SATA), a peripheral component interconnect express (PCIe), a universal serial bus (USB), and/or a small computer system interface (SCSI), among other connectors and interfaces. In general, however, host controller 112 can be coupled to an interface for passing control, address, data and other signals between the memory devices 120-1, 120-2, . . . , 120-N, the host system 110, and attached devices, such as host system memory 116.

In one or more embodiments, the memory devices 120-1, 120-2, . . . , 120-N can include one or more memory device controllers that can be used to facilitate operations, such as read, write, and/or erase commands, among other operations, that are communicated to the memory devices 120-1, 120-2, . . . , 120-N from the host system 110. The memory devices 120-1, 120-2, . . . , 120-N can be chained together and coupled to a bus and in some embodiments, the last memory device, e.g., 120-N, can be removed from the chain. In one or more embodiments, the circuitry in one or more memory device controllers can include control circuitry for providing a translation layer between host system 110 and the memory devices 120-1, 120-2, . . . , 120-N. Thus, a memory device controller could selectively couple an I/O connector (not shown in FIG. 1) of memory devices 120-1, 120-2, . . . , 120-N to receive the appropriate signal at the appropriate I/O connection at the appropriate time. Similarly, the communication protocol between a host system 110 and the memory devices 120-1, 120-2, . . . , 120-N may be different than what is required for access to the memory devices 120-1, 120-2, . . . , 120-N. The memory device controllers could then translate the command sequence received from a host system 110 into appropriate command sequences to achieve the desired access to memory devices 120-1, 120-2, . . . , 120-N. Each translation may further include changes in signal voltage levels in addition to command sequences.

In one or more embodiments, the port 102 can be a hardware port. A hardware port can be used to couple a peripheral device, such as a digital camera, an MP3 player, a network device, and/or USB device, among other devices. A hardware port can also be used to couple a media codec for play-back of audio and/or video. The coupling of a hardware device to the host system 110 via port 102 can allow the hardware devices to communicate with the memory devices 120-1, 120-2, . . . , 120-N, host system memory 116, and/or other memory in the host system 110. Communication can include reading, writing, and/or erasing data to and/or from the hardware devices, the memory devices, and/or the memory on or coupled to the host system 110.

The embodiments of FIG. 1 can include additional circuitry that is not illustrated so as not to obscure embodiments of the present disclosure. For example, the memory devices 120-1, 120-2, . . . , 120-N can include address circuitry to latch address signals provided over I/O connectors through I/O circuitry. Address signals can be received and decoded by a row decoder and a column decoder, to access the memory devices 120-1, 120-2, . . . , 120-N. It will be appreciated by those skilled in the art that the number of address input connectors depends on the density and architecture of the memory devices 120-1, 120-2, . . . , 120-N.

Figure 2:
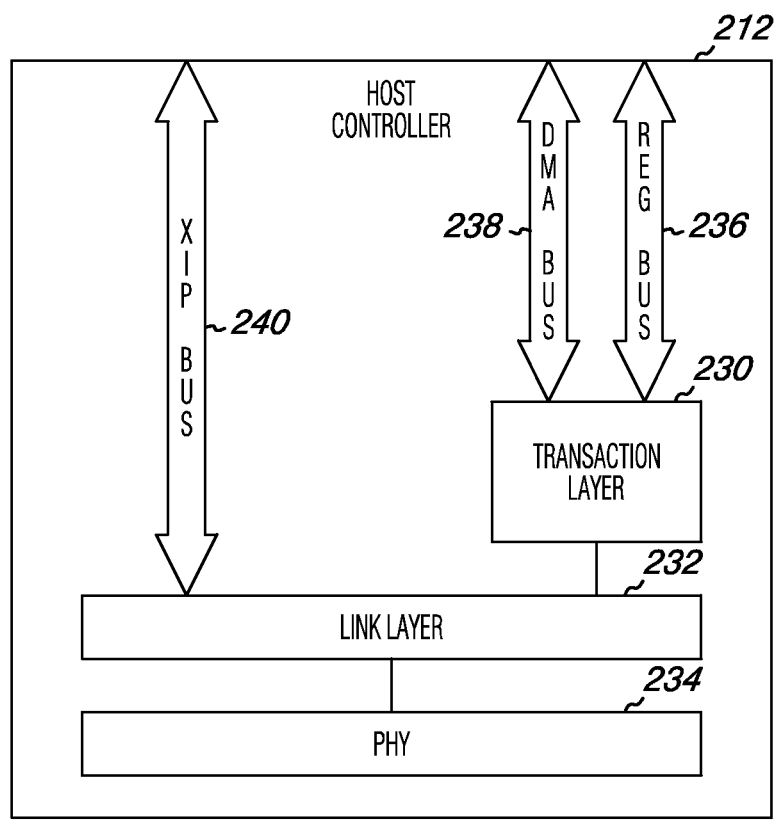
FIG. 2 illustrates a block diagram of a host controller in accordance with one or more embodiments of the present disclosure.

FIG. 2 illustrates a block diagram of a host controller 212 in accordance with one or more embodiments of the present disclosure. In FIG. 2, the host controller 212 includes a transaction layer 230, a link layer 232, and a physical (PHY) layer 234. In one more embodiments, the host controller 212 can use the transaction layer 230, link layer 232, and physical layer 234 to help ensure that error free packets of data are reliably transported. In FIG. 2, the host controller communicates packets of data between memory, such as system and/or host controller memory, memory devices, and the host processor via the direct memory access (DMA) bus 238, the register bus 236, and/or the execute in place (XIP) bus 240.

In one or more embodiments, the host controller can notify the memory devices that data is ready to be transferred between system and/or host controller memory and the memory devices. The memory devices can request the transfer of data from the system and/or host memory controller. The memory devices send the appropriate commands, status information, and data based on the state of the memory devices. The host controller can manage the DMA transfer of data and can provide flow control to and from the memory devices without processor intervention. As described herein, the memory device capabilities are mapped to memory and the host controller 212 is used to transfer and/or control flow of commands, data and/or status, among other signals, between memory devices and system and/or host controller memory.

In the embodiment of FIG. 2, the DMA bus 238 can be used to communicate signals between the transaction layer 230 of host controller 212 and system and/or host controller memory. The DMA bus 238 can includes address and byte count information when communicating signals. The DMA bus 238 can be coupled to system and/or host controller memory via a DMA engine, e.g., DMA engine 122 in FIG. 1. The transaction layer 230 can provide the DMA interface for the host system. The DMA bus 238 can transfer read and/or write commands that are built in system and/or host controller memory. The DMA bus 238 can also transfer device commands and device dependent information that is stored in system and/or host controller memory, as described herein.

In one or more embodiments, a host system can include memory on a host controller and/or system memory coupled to the host system. A host system with system and/or host controller memory can include a DMA bus 238 to both the host controller memory and the system memory to transfer signals from the host controller and/or system memory to the transaction layer 230 on the host controller 212.

In FIG. 2, the register bus 236 can be used to transfer signals between a number of registers on the host controller 212 and the host processor. The registers can include DID information and can be used when building commands on the system and/or host controller memory to provide device class independent information, such as device enable/disable and/or power state control/status, among other device class independent information, as described herein.

In FIG. 2, the transaction layer 230 can receive information from the system and/or host controller memory via the DMA bus 238. The transaction layer 230 is in communication with the link layer 232. The link layer is in communication with the XIP bus 240. The XIP bus 240 can transfer signals between the link layer 232 in the host controller 212 and the host processor. The commands built in the system and/or host controller memory can be transferred to the memory devices through the XIP bus 240. The host controller provides flow control of signals between memory devices and system and/or host controller memory via the XIP bus 240 and the DMA bus 238. The XIP bus can transfer signals and/or data from memory devices to the host control and onto the system and/or host controller memory via the transaction layer 230, link layer 232, and the physical layer 234 without processor intervention. The physical layer 234 can be in communication with the link layer. The PHY can provide cyclic redundancy check (CRC), an acknowledged/not acknowledged indication, and/or can handle arbitration and scheduling for the signals and/or data transferred via the host controller 212 between memory devices and system and/or host controller memory. The link layer 232 can provide encoding and/or decoding of the signals and/or data from memory devices coupled to the host controller 212. Also, the link layer 232 can facilitate and indicate the reception and transmission of signals and/or data from memory devices coupled to the host controller 212.

Figure 3:
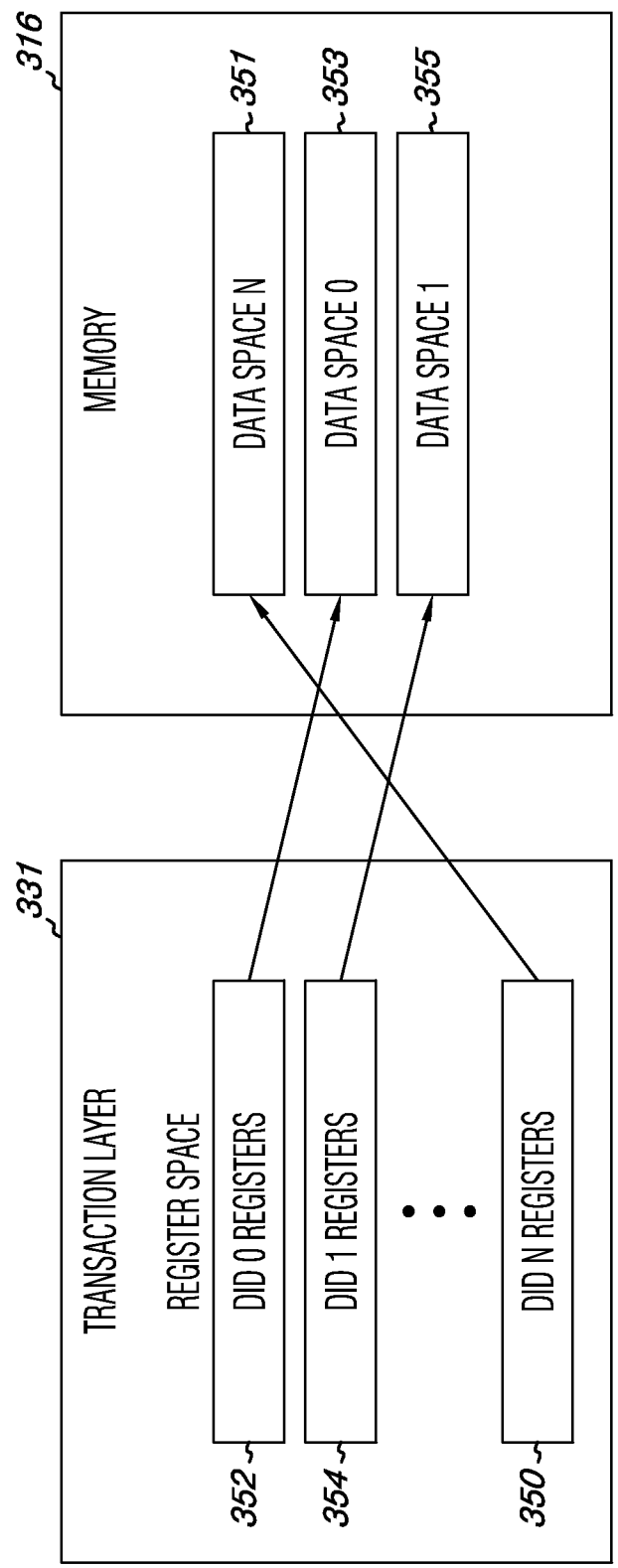
FIG. 3 illustrates a block diagram of a transaction layer register space and host system memory in accordance with one or more embodiments of the present disclosure.

FIG. 3 illustrates a block diagram of a transaction layer register space 331 and memory 316 in accordance with one or more embodiments of the present disclosure. The memory 316 in FIG. 3 can be system memory and/or host controller memory. In one or more embodiments, one or more registers can be included in the host controller. In FIG. 3, transaction layer register space 331 is included in the transaction layer of a host controller. The register space can be used to store data relating to memory devices that the host controller can use to perform functions on memory devices and system and/or host controller memory and/or peripheral devices coupled to the host controller.

In the embodiment illustrated in FIG. 3, the register space 331 can include a number of DID registers 350, 352, and 354. Each of the devices can have a DID register associated with the device. For example, DID register 352 labeled DID 0 registers is associated with device 0 that is coupled to the host controller. In one or more embodiments, a number of devices can be coupled to the host controller. DID register 350 labeled DID N registers is associated with the Nth device where N is an integer.

In one or more embodiments, DID register 350, 352, and 354 can store device class independent information. Device class independent information can include information regarding parameters that many device types use in their operation. For example, the device class independent information can include memory device control and interrupt information, device enable/disable, power state control/status, pointers to device class dependent information in system and/or host controller memory, pointers to command in system and/or host controller memory, an indication of the device class associated with the DID register, non-masked interrupt status, and/or immediate commands/operation, such as reset and other link layer commands, among other types of information.

In one or more embodiments, the device class independent information is written to the transaction layer register space 331 on power-up of the memory device associated with the DID register, e.g., on system power-up, on device insertion when the device is coupled to the host system, etc. A driver, such as a software driver, for the device can cause the device class independent data to be written to the DID register. A driver can be used to write the device class independent data at power-up of a device, therefore the memory array in the register space 331 can be volatile memory, such as DRAM and/or non-volatile memory, such as Flash. Also, in one or more embodiments the DID register can have device class independent information written to it at initial power-up of a device when the device is first coupled to the host system. The register space memory can be non-volatile memory, such as Flash, and store the device class independent data in the register permanently or until a new driver adds or replaces the data in the DID register.

In FIG. 3, memory 316 can include data space 351, 353, and 355, which can include commands and device dependent information. Device class dependent information can include parameters and/or configuration information that is associated with a device that is coupled to the host system. The parameters and/or configuration information included in the device class dependent information can be used when building commands to operate devices associated with the device class dependent information. Data space N 351 can be associated with device N, data space 1 353 can be associated with device 1, and data space 2 355 can be associated with device 2. Also, data spaces 351, 353, and 355 can be associated with DID registers 350, 352, and 354, respectively.

In one or more embodiments, the device class dependent information stored in the data spaces in memory 316 can include information for controlling the device capabilities when the device is executing a command. By putting the device class dependent information in the memory 316, the processor is relieved of operational burdens. The device capabilities can be encoded in hardware on the host controller according to some previous approaches, however according to one or more embodiments of the present disclosure the device capabilities can be removed from hardware on the host controller and stored in the memory 316, where they can be written to and/or read from a number of locations in memory 316.

In one or more embodiments, the device class dependent information is written to memory 316 on power-up of the memory device associated with the DID register, e.g., on system power-up, on device insertion when the device is coupled to the host system, etc. A driver, such as a software driver, for the device can cause the device class dependent data to be written to the memory 316. A driver can be used to write the device class dependent data at power-up of a device, therefore the memory array in the memory 316 memory can be volatile memory, such as DRAM and/or non-volatile memory, such as Flash. Also, in one or more embodiments the memory 316 can have device class dependent information written to it at initial power-up of a device when the device is first coupled to the host system. The memory 316 can be non-volatile memory, such as Flash, and store the device class dependent data in the memory 316 permanently or until a new driver adds or replaces the data in the memory 316.

In one or more embodiments, a pointer can be included in the DID registers. The pointer can consist of the address in a memory 316 where the data space is located. The address included in the pointer can point the DID registers containing device class independent information to the device class dependent information in memory 316. The pointer in the DID registers on the transaction layer register space 331 can be used to memory map the device dependent and independent information. The pointer can identify the location of the device class dependent information in memory 316.

In one or more embodiments, the data spaces containing the device class dependent information can be written to the host system memory, and/or host controller memory on the host controller. In such embodiments, the data spaces on the system and/or host controller memory can be memory mapped together with pointers stored in the DID register in the transaction layer register space 331.

Figure 4:
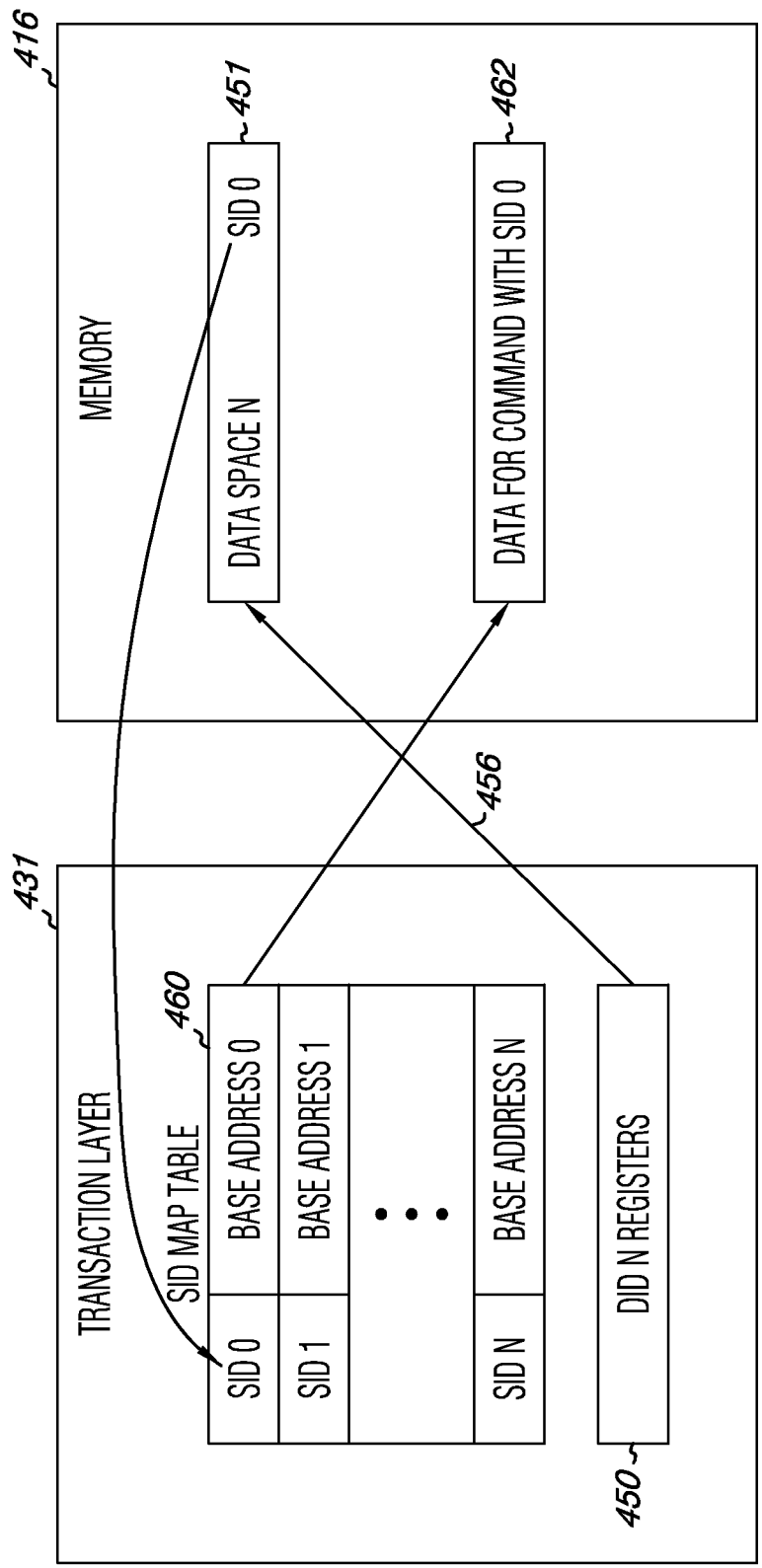
FIG. 4 illustrates a block diagram of a transaction layer and host system memory in accordance with one or more embodiments of the present disclosure.

FIG. 4 illustrates a block diagram of a transaction layer 431 and memory 416 in accordance with one or more embodiments of the present disclosure. The memory 316 in FIG. 3 can be system memory and/or host controller memory. In FIG. 4, memory 416 can include device commands and device dependent information in device spaces, as discussed above in association with FIG. 3. Device spaces can include device class dependent information, such as parameters and/or configuration information. A host system processor can build a command in device space N 451, such as a read command and/or a write command for the memory device associated with the device space, in this case device N. The commands written to the device space N 451 can be written using a communication protocol, such as SCSI, among other protocols. The command is built by the host system processor and stored in device space N 451 in memory 416 using a communication protocol and the device class dependent information in device space N 451 and the device class independent information in DID N registers 450 is used to modify the command for use by the memory device.

In or more embodiments, the command can include a corresponding data buffer. The data buffer can be used to store data that is written to system and/or host controller memory during a device read command. Also, the data buffer can be used to store data that is written to the device during a device write command. The data buffer can be in system and/or host controller memory and can be allocated by the command built and stored in device space N 451.

The device commands in memory 416 can include a base address that indicates the location of the data buffer. The command can alternatively use a segment identifier (SID) in the command to indicate the location of the data buffer. The SID can reference a SID map table 460 on the transaction layer 431. The SID map table 460 can be located in a memory array on the transaction layer 431 or in other embodiments the SID map table can be located in other memory locations, such as system memory. The SID map table can include a number of SIDs that are associated with a number of base addresses, where each SID is associated with a base address. The base address is an address in system and/or host controller memory that can indicate a data buffer location. The SID map table can be updated by the processor to assign base addresses to SIDs based on the availability of memory location in system and/or host controller memory.

In one or more embodiments, a number of SIDs can be used with a command based on the availability of system and/or host controller memory to accommodate a data buffer. The SID(s) associated with the command can be used when the command is executed. The SID will reference the SID map table 460. The SID can be located in the SID map table 460. Once the SID is located in the SID map table, a base address associated with the SID is identified. The base address is used during execution of the command to write data to and/or send data from a data buffer, e.g., data for command with SID 0 462, indicated by the base address location in system and/or host controller memory.

In one or more embodiments, the SID can indicate a range of addresses that can be used as the data buffer for the command. The range of addresses can include a base address indicated as the start of the data buffer. The range of addresses associated with a SID can be used to limit the amount of memory that can be used to execute a command and can be used to identify and disable invalid commands, e.g. commands that request memory outside of the base address range.

In one or more embodiments, a command in DID information location 451 can include an explicit, e.g., actual, base address, and not use a SID. The base address would be used by the command as the data buffer location. In some embodiments, the device when executing the command can add an offset to the base address to indicate a full memory address, where the data buffer will be located. The base address in the command can indicate a location in the system and/or host controller memory.

Figure 5:
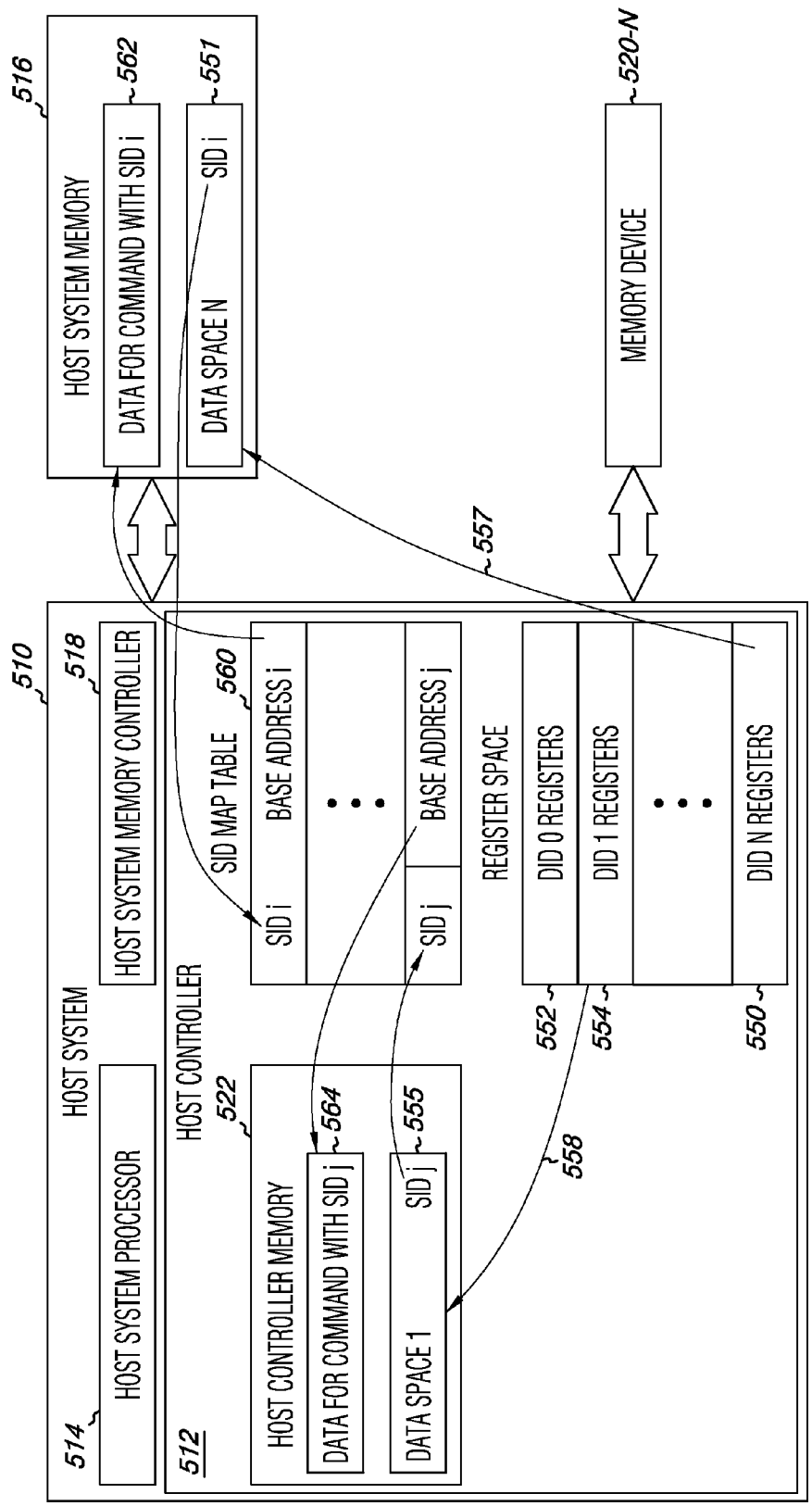
FIG. 5 illustrates a block diagram of a host system, host system memory, and a memory device in accordance with one or more embodiments of the present disclosure.

FIG. 5 illustrates a block diagram of a host system 510, host system memory 516, and a memory device 520-N in accordance with one or more embodiments of the present disclosure. In FIG. 5, host system memory 516 and/or host controller memory 522 can be used to store device class dependent information and/or commands to operate a memory device 520-N coupled to the host system 510.

In FIG. 5, device spaces can include device class dependent information for memory device 520-N and/or a command built by the processor to operate device N. The command can use a SID, e.g. SID i in FIG. 5, to reference the SID map table 560 on the host controller 512. The SID map table indicates the base address, e.g., base address i for FIG. 5, where the data buffer, e.g. data for command with SID i 562 can be located.

In one or more embodiments, once a command is written to the device space N 551 in the host system memory 516, a pointer is written to the DID registers 550, 552, and 554, e.g., DID N registers 550, associated with the device space N 551. The pointer 557 can be detected by the host controller 512 and the pointer 557 can be used to locate the command in the host system memory 516. Once the command is located in the host system memory 516, the command is transferred to the device 520-N via the host controller 512 when the device 520-N initiates a DMA transfer of the command. The command is executed by the memory device 520-N and data is written to and/or read from the data buffer, e.g., 562 by the device using the SID and/or base address indicated in the command.

In one or more embodiments, a number of devices can be operated using commands and/or device dependent information in the system and/or host controller memory. As described above in association with FIG. 5, host system memory 516 can be used to store device commands and device dependent information and the host system processor 514 builds a command stored in device spaces in host system memory 516 for operating memory device 520-N. Also in FIG. 5, host controller memory 522 can be used to store device commands and device dependent information in device space 1 555 for operating device 1 (not shown in FIG. 5) and store data in a buffer in data for command with SID j 564.

In one or more embodiments, once a command is written to the device space 1 555 in the host controller memory 522, a pointer 558 is written to the DID register, e.g., DID 1 registers 554, associated with the device commands and device dependent information in device space 1 555. The pointer 558 can be detected by the host controller 512 and the pointer 558 can be used to locate the command in the host controller memory 522. Once the command is located in the host controller memory 522, the command can be transferred to the memory device via the host controller 512 when the memory device initiates a DMA transfer of the command. The command is executed by the memory device and data can be written to and/or read from the data buffer, e.g., 564, by the device using the SID and/or base address indicated in the command.

In one or more embodiments, host system memory 516 and/or host controller memory can be used to operate memory devices by including device class dependent data in the memory and the host system processor 514 can build commands in the host system memory 516 and/or host controller memory 522 for execution by the memory device. FIG. 5 illustrates one example of using system memory and/or host controller memory to operate two memory devices. In one or more embodiments, any combination of system memory 518 and/or host controller memory 522 can be used according the embodiments described herein.

Figure 6:
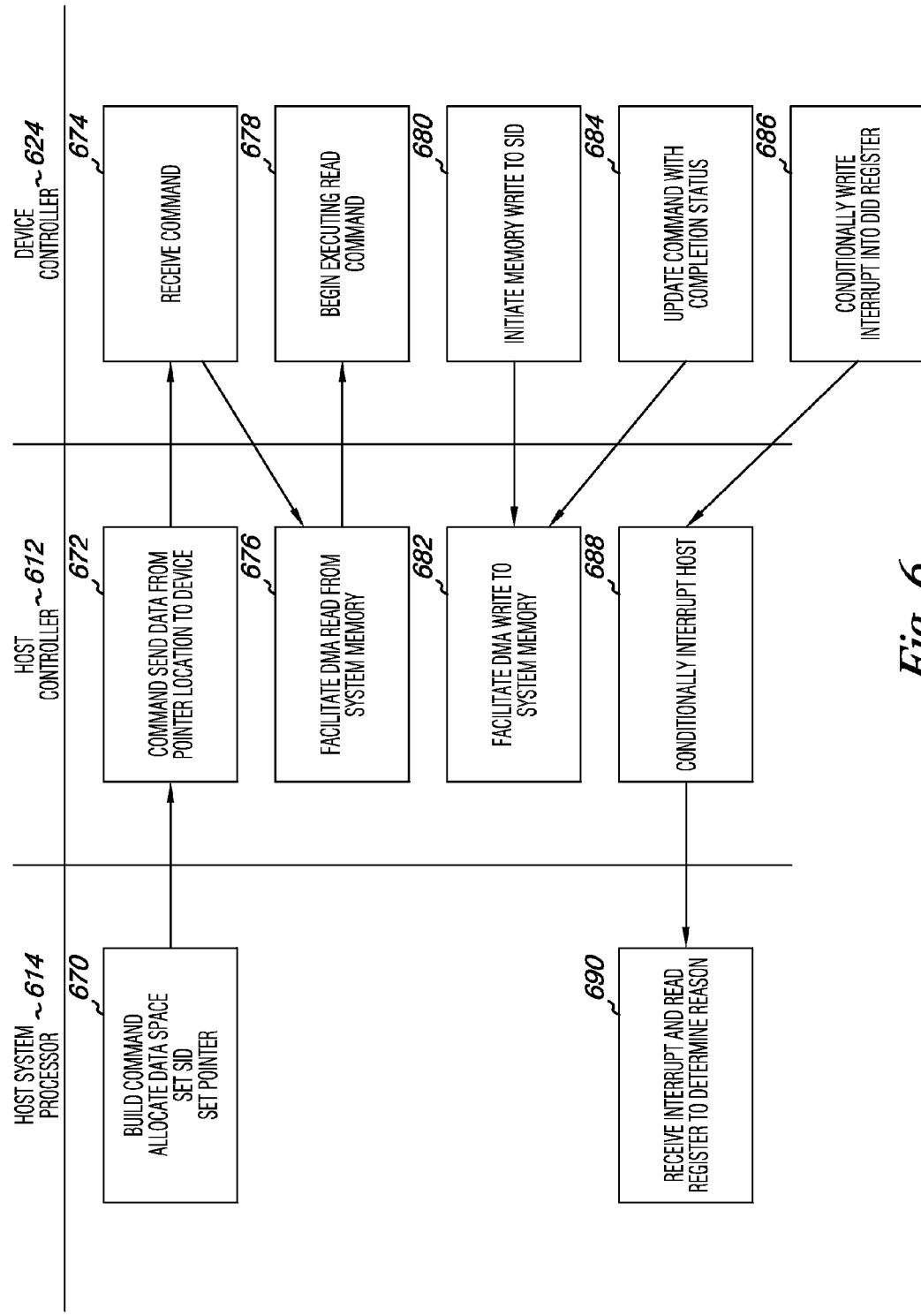
FIG. 6 is a block diagram illustrating the operation of a memory system in accordance with one or more embodiments of the present disclosure.

FIG. 6 is a block diagram illustrating the operation of a memory system in accordance with one or more embodiments of the present disclosure. The embodiment illustrated and described in association with FIG. 6 is for a read command from a device. A read command consists of reading data from a memory device, transferring the data to system and/or host controller memory, and writing the data to the system and/or host controller memory, therefore a read command consists of a read operation and a write operation. Also, one or embodiments of the present disclosure can include a write command. A write command consists of read data from system and/or host controller memory, transferring the data to a memory device, and writing the data to the memory device, therefore, a write command also consists of a read operation and a write operation.

A command for a device can be built and executed according to FIG. 6. In FIG. 6, the host system processor 614 can build a command, allocate data space, e.g., data buffer, set a SID, and set a pointer 670. The host controller 612 can notify the device of the command data and pointer location (in system and/or host controller memory) 672. The device controller 624 receives this notification and then the device can act upon the notification by receiving the command 674 and then the memory device initiates a DMA read from system and/or host controller memory 676.

The device controller 624 begins executing a read command 678 and a memory write to SID is initiated 680. A memory write to SID 680 can write requested data to system and/or host controller memory in the location indicated by the SID and the associated base address. Once a memory write to SID 680 is initiated and DMA write to system memory is facilitated 682, the requested data is being read from the device and written to the system and/or host controller memory for use by the host system using device dependent information and commands from the host and/or host controller memory.

In FIG. 6, once the requested data is transferred from the device to the system and/or host controller memory an update command with completion status 684 is generated by device controller 624. The completion status indicator is indicated to the host controller 612 and a DMA write to system memory is facilitated 682.

Also as shown in FIG. 6, a device can interrupt a command. Device controller 624 can conditionally write an interrupt into a DID register 686 on the host controller 612. The host controller 612 can conditionally interrupt the host 688 and the host system processor 614 can receive the interrupt and read the DID register to determine the reason for the interrupt 690.

The embodiment illustrated in FIG. 6 is for a read command from a device. One or more embodiments of the present disclosure can also be used with a write command. A write command would include the host controller facilitating a DMA read from a SID location in system and/or host controller memory and then transferring the data to the device. The device controller could then write the data to the device.

CONCLUSION

The present disclosure includes methods, devices, and systems for controlling a memory device. One method for controlling a memory device embodiment includes storing device class dependent information and a command in one or more of host system memory and host controller memory, setting a pointer to the command in a register in a host controller, directing access to the one or more of host system memory and host controller memory with the memory device via the host controller; and executing the command with the memory device.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. As used herein, the term "and/or" includes any and all combinations of one or more of the associated listed items.

It will be understood that, although the terms first, second, etc. may be used herein to describe various elements and that these elements should not be limited by these terms. These terms are only used to distinguish one element from another element. Thus, a first element could be termed a second element without departing from the teachings of the present disclosure.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for controlling a memory device, comprising:
   locating a number of commands stored in memory associated with a host system using a pointer that is stored in a register in a host controller,
   transmitting the number of commands to a number of memory devices, wherein the number of commands are based on device class dependent information stored in the memory associated with the host system; and
   executing the number of commands with a memory device controller on the number of memory devices.

2. The method of claim 1, wherein the method includes storing device class dependent information in the memory associated with the host system.

3. The method of claim 1, wherein the method includes directing the host controller, via the pointer, to the number of commands and to device class dependent information stored in the memory associated with the host system.

4. The method of claim 1, wherein the method includes storing device class independent information in one or more registers in a host controller.

5. The method of claim 4, wherein storing device class independent information includes storing one or more types of information selected from the group including:
   device control and interrupt information;
   device enable/disable information;
   device power state control/status information;
   one or more pointers to device-class dependent information in the host system memory;
   one or more pointers to commands in the host system memory;
   a particular device class associated with a particular transaction layer register entry; and
   a reset command.

6. The method of claim 1, wherein the method includes building the number of commands with a host processor.

7. The method of claim 1, wherein the method includes building the number of commands in the memory associated with the host system.

8. The method of claim 1, wherein executing the number of commands includes reading data from the number of memory devices.

9. The method of claim 1, wherein executing the number of commands includes writing data to the number of memory devices.

10. A method for controlling a memory device, comprising:
    locating a command stored in memory associated with a host system using a pointer from a register in a host controller, wherein the command is built based on device class dependent information; and
    receiving the command from the host system at a memory device external to the host system; and
    executing the command with the memory device by initiating a direct memory access (DMA) transfer of write command data in the memory associated with the host system to the memory device.

11. The method of claim 10, wherein the method includes building the command with a host processor.

12. The method of claim 10, wherein method includes storing device class independent information in one or more registers in a host controller.

13. The method of claim 10, wherein executing the command causes the write command data to be read from the host system and written to the memory device.

14. The method of claim 10, wherein the command includes a segment identifier (SID) to indicate where the write command data is written on the memory device.

15. A method for operating a memory device, comprising:
    locating a command stored in memory associated with a host system using a pointer from a register in a host controller, wherein the command is built based on device class dependent information; and
    receiving the command from the host system at a memory device external to the host system; and
    executing the command with the memory device by initiating a direct memory access (DMA) transfer of read command data in the memory device to the memory associated with the host system.

16. The method of claim 15, wherein the device class dependent information is information that indicates operating parameters that are specific to the memory device.

17. The method of claim 15, wherein executing the command causes the read command data to be read from the memory device and written to the host system.

18. The method of claim 15, wherein executing the command includes managing DMA of data and providing flow control without host processor intervention.

* * * * *